United States Patent

DuBell et al.

[11] 3,978,662
[45] Sept. 7, 1976

[54] COOLING RING CONSTRUCTION FOR COMBUSTION CHAMBERS

[75] Inventors: Thomas L. DuBell, Maineville; Thomas C. Campbell; James L. Thompson, both of Cincinnati, all of Ohio

[73] Assignee: General Electric Company, Cincinnati, Ohio

[22] Filed: Apr. 28, 1975

[21] Appl. No.: 572,066

[52] U.S. Cl. .............................. 60/39.65; 60/39.66; 431/351
[51] Int. Cl.² .......................... F02C 3/00; F02C 7/18
[58] Field of Search ....................... 60/39.65, 39.66; 431/351, 352

[56] References Cited
UNITED STATES PATENTS

| 3,589,128 | 6/1971 | Sweet | 60/39.65 |
|---|---|---|---|
| 3,745,766 | 7/1973 | Melconian | 60/39.65 |
| 3,845,620 | 11/1974 | Kenworthy | 60/39.66 |
| 3,899,876 | 8/1975 | Williamson | 60/39.66 |

Primary Examiner—Carlton R. Croyie
Assistant Examiner—Robert E. Garrett
Attorney, Agent, or Firm—Henry J. Policinski; Derek P. Lawrence

[57] ABSTRACT

An apparatus for passing a portion of a cooling fluid, flowing in a plenum in a predetermined direction, in a protective film upon a liner defining a hot gas passage. The apparatus is comprised of a first liner portion or segment partially defining the plenum and a second liner portion or segment partially defining the hot gas passage and cooperating with the first liner segment to form a pocket. A first lip is located at the downstream end of the second liner segment and is radially adjacent a second lip located at the upstream end of the first liner segment. The first lip is spaced from the first liner segment to form an exit from the pocket for directing cooling air along the first liner segment in the predetermined direction. The apparatus further comprises a plurality of apertures in the first liner to pass cooling fluid in a plurality of streams into the pocket and along the second lip in a direction substantially opposite from said predetermined direction. The second lip may be constructed of a length sufficient to permit the plurality of streams to at least partially coalesce while passing along the second lip in the opposite direction. The fluid may be directed upon the second lip to accomplish partial diffusion of the streams. The apparatus may also comprise secondary means for additionally diffusing the cooling fluid flow within the pocket and for turning the flow of the substantially coalesced cooling fluid to the predetermined direction prior to the passing of the cooling fluid from said exit.

3 Claims, 4 Drawing Figures

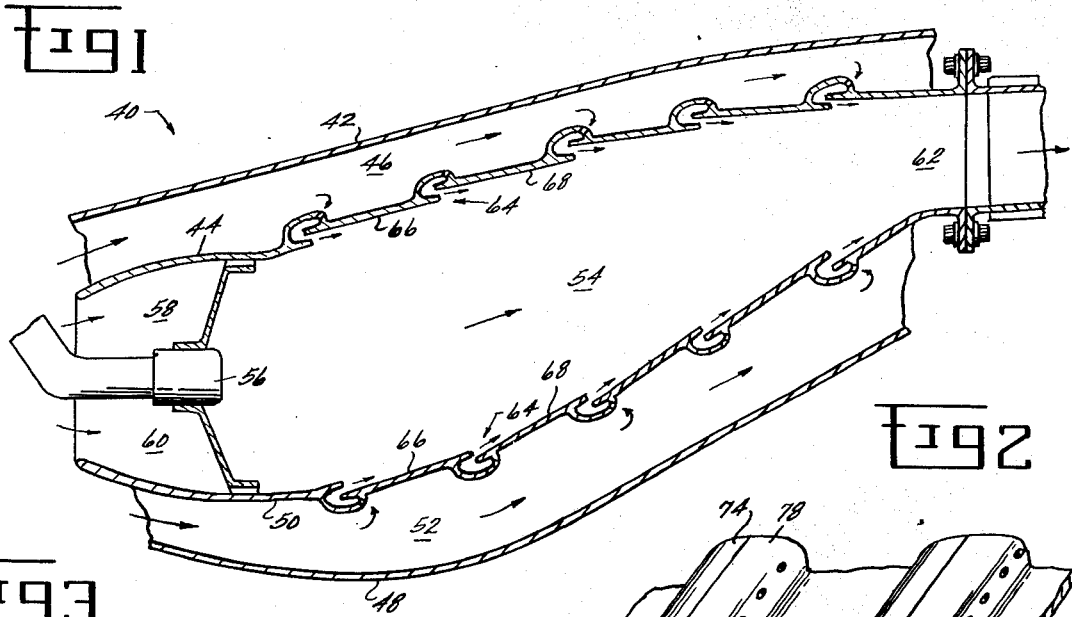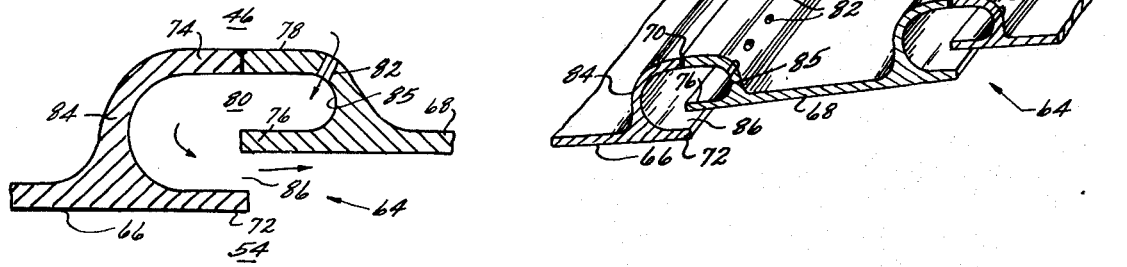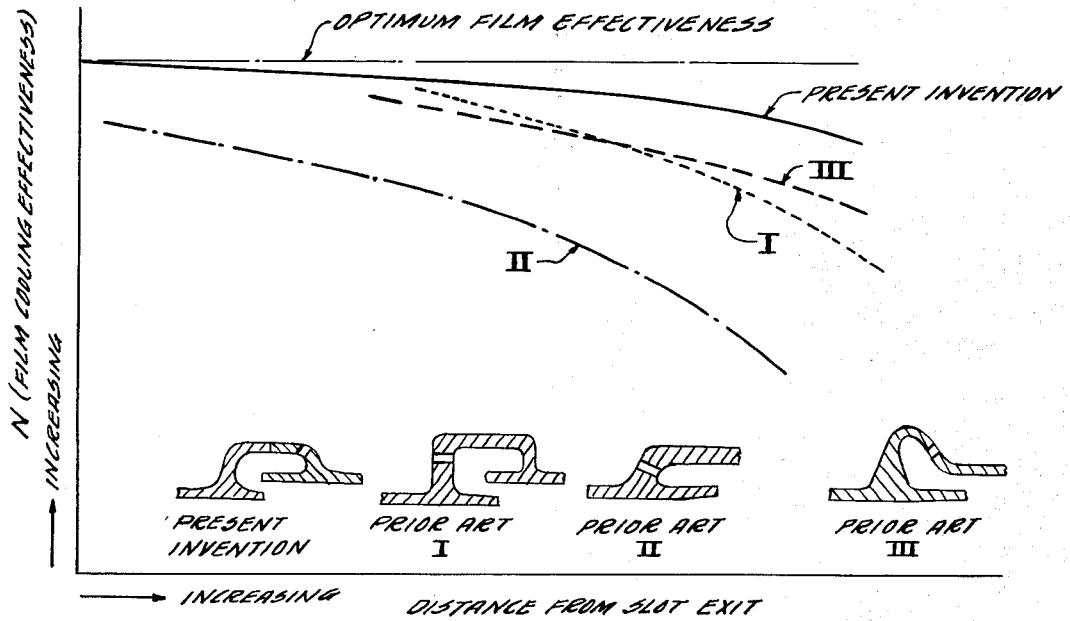

COOLING RING CONSTRUCTION FOR COMBUSTION CHAMBERS

BACKGROUND OF THE INVENTION

This invention relates to combustion apparatus and, more particularly, to means for providing effective film cooling of combustion chambers. For convenience of illustration and discussion, the invention will be described in connection with a jet engine of the gas turbine type. However, it will be appreciated that the structure is suitable for any high temperature application which requires effective film cooling.

Aircraft engines presently in operational use and those under development for future application are designed to operate at extremely high temperatures. Combustors associated with such engines must not only be compatible with the high temperature environment but must also perform efficiently for extended periods of time before removal for repair and maintenance. Since the life of a combustor liner is directly affected by the temperature at which it operates, efficient and reliable means for cooling the combustor and lowering its operating temperature must be provided.

State-of-the-art cooling means for combustor chambers have provided a moving film of cooling air between the inner surface of the combustor liner and the hot gas stream. The film of cooling air prevents the hot gas stream from contacting the combustor liner and transferring heat thereto. Generally, the protective film is introduced into the combustion chamber from a plenum surrounding the combustor.

It is essential for optimum effectiveness that the film of cooling air forming the protective boundary between the combustor liner and the hot gas stream be continuous. Furthermore, the film must be introduced at a velocity and direction preselected to avoid intermixing with the hot gases. Generally, the cooling film must consist of a uniform layer of cooling air having a uniform exit velocity around the cooled periphery of the liner.

State-of-the-art cooling devices have attempted to achieve effective cooling of the combustor liner by a variety of means. The earliest devices simply introduced cooling air through a series of apertures in an upstream portion of the liner into a lipped annular pocket wherein the streams of fluid from the individual apertures were permitted to coalesce to form a uniform boundary. The cooling air then emerged from the lipped pocket into the combustion chamber along the inner surface of the liner. These early devices were unacceptable for at least two reasons. First, the apertures were located such that they admitted cooling air having a high dynamic pressure head and hence a high total pressure head incompatible with the formation of an efficient boundary layer film. Secondly, the high velocity of the cooling air passing through the apertures required a long, extended lip to permit the fluid streams to coalesce before emergence into the combustor chamber. The long lip is subject to thermal stresses which cause warpage and buckling of the lip. Later prior art devices have introduced dimpled lips in an attempt to solve the aforementioned warpage problem. Combustors with dimpled lips however proved to have limited life due to hot spots created in wakes in the boundary layer caused by the dimples and due to rapid crack propagation inherent in a dimpled design.

Still later prior art devices provided improvements in combustor liner cooling by introducing means to eliminate the dynamic pressure head from the cooling air and baffle means for diffusing the cooling fluid streams prior to their emergence into the combustor chamber. These prior art devices have not been successful in providing a uniform film of cooling air as boundary layer protection to the combustor liner.

BRIEF SUMMARY OF THE INVENTION

It is therefore a primary object of the present invention to provide a cooling ring construction for use with combustion chambers which provides for the introduction of a uniform layer of cooling air into the combustion chamber at a uniform velocity thereby isolating the combustor chamber from the thermal effects of the hot gas stream.

It is another object of this invention to provide a cooling ring of rugged and durable construction and which is resistant against warpage and buckling.

These and other objects and advantages, which will become apparent hereinafter, are accomplished by the present invention which provides apparatus for passing cooling fluid flowing in a plenum in a first predetermined direction in a protective film upon a liner partially defining a hot gas passage. The apparatus is comprised of a first liner portion or segment partially defining the plenum and a second liner portion or segment partially defining the hot gas passage and cooperating with the first liner segment to form a pocket. A first lip is located at the downstream end of the second liner segment and is radially adjacent a second lip located at the upstream end of the first liner segment. The first lip is spaced from the first liner segment to form an exit from the pocket for directing cooling air along the first liner segment in the predetermined direction. The apparatus further comprises a plurality of apertures in the first liner to pass cooling fluid in a plurality of streams into the pocket and along the second lip in a direction substantially opposite from said predetermined direction. The second lip may be constructed of a length sufficient to permit the plurality of streams to at least partially coalesce while passing along the second lip in the opposite direction. The fluid may be directed upon the second lip to accomplish partial diffusion of the streams. The apparatus may also comprise secondary means for additionally diffusing the cooling fluid flow within the pocket and for turning the flow of the partially coalesced cooling fluid to the predetermined direction prior to the passing of the cooling fluid from said exit.

BRIEF DESCRIPTION OF THE DRAWINGS

FIG. 1 depicts a cross-sectional view of a combustor incorporating a combustor liner according to the present invention;

FIG. 2 depicts a perspective view of a section of the combustor liner of the present invention;

FIG. 3 depicts an enlarged cross-sectional view of a portion of the combustor liner shown in FIG. 2; and FIG. 4 depicts a plot of film cooling effectiveness as a function of distance from the slot exit for the present invention and a number of prior art devices.

DESCRIPTION OF THE PREFERRED EMBODIMENT

Referring to FIG. 1, a combustor shown generally at 40 is comprised of an outer wall 42 and an axially exnding outer liner 44 with a cooling air plenum 46 formed therebetween. An inner wall 48 cooperates with inner liner 50 to define a radially inner cooling fluid plenum designated 52. Liners 44 and 50 define combustion zone 54 into which fuel is sprayed by nozzle 56. The fuel is mixed with compressed air entering the combustor zone through passages 58 and 60 and the mixture is ignited and expelled through combustor exit 62.

In the combustion process, the hot gases produced from the burning of the fuel-air mixture reach extremely high temperatures. The present invention addresses the problem of inhibiting the transfer of heat from the hot gas stream in combustion zone 54 to liners 44 and 50 and, more particularly to the production of a uniform continuous layer of cooling fluid along the liners 44 and 50 to act as a thermal barrier preventing the transfer of heat.

Generally, compressed air, bled from a portion of the gas turbine engine not shown, is introduced into cooling fluid plenums 46 and 52. Since it is necessary to introduce cooling air from plenums 46 and 52 into combustion zone 54 at a pressure and velocity compatible with the formation of a boundary layer barrier, the present invention provides a cooling ring construction generally designated 64 in FIG. 2. Cooling ring construction 64 is utilized in both outer liner 44 and inner liner 50 and while the description hereinafter presented will primarily reference liner 44, it is understood that the description will be equally applicable to liner 50.

The liners 44 and 50 each are comprised of a number of axially adjacent segments cooperating with each other to form a continuous wall separating cooling plenum 46 and 52, respectively, from combustion zone 54. For example, a typical upstream or second segment 66 cooperates with a downstream or first segment 68 in a manner to clearly define the continuity of outer liner 44. Segment 66 is joined to segment 68 by welding at 70 or by other conventional means.

Referring to FIG. 3, an enlarged cross section of segments 66 and 68 in joined cooperation is shown. This juncture comprises the cooling ring construction of the present invention which passes fluid in a protective barrier upon the inner surface of outer liner 44.

As can be observed from FIG. 3, liner segment 66 partially defines the cooling fluid plenum 46 and the hot gas combustion zone 54. Similarly liner segment 68 partially defines cooling fluid plenum 46 and hot gas combustion zone 54. The downstream end of upstream liner segment 66 is generally of U-shaped cross section with first lip 72 forming the radial innermost leg of the U and flange 74 forming the other leg of the U. Lip 72 is of a short axial length relative to its radial height thereby increasing its resistance against warpage or distortion from thermal stress. Similarly, the upstream end of downstream liner segment 68 is generally of a U shaped cross section with second lip 76 forming one leg of the U and flange 78 forming the other leg of the U. Flange 74 and flange 78 are in abutting relationship with each other and securely affixed together at 70 as by welding, brazing or other conventional means to link liner segment 66 to liner segment 68. With the liner segments 66 and 68 in this position it is readily observed that the opening of the U associated with liner segment 66 and the opening of the U associated with liner segment 68 confront one another and generally form a pocket 80. Lip 76 projects into pocket 80. A plurality of apertures 82 in the base of the U associated with liner segment 68 communicates pocket 80 with cooling fluid plenum 46. Apertures 82 are spaced circumferentially about liner segment 68 and arranged to direct cooling fluid into pocket 80 on and along lip 76.

Pocket 80 is bounded at its upstream end by the base 84 of the U associated with liner segment 66 and at its downstream end partially by the base 85 of the U associated with liner segment 68. Exit 86 disposed at the downstream end of pocket 80 is defined by the radial distance between lip 72 and lip 76. Both pocket 80 and exit 86 extend circumferentially around liner 44 and form substantially annular rings which are isolated from the combustion zone.

Cooling fluid plenum 46 is comprised of a stream of cooling fluid with relatively high total pressure head flowing in the downstream direction. The total pressure head is comprised of a dynamic pressure head relating to the velocity of the cooling fluid and a static pressure head. The present invention captures only the static portion of the total pressure head by apertures 82 which are disposed such that they open into plenum 46 in the downstream direction and into pocket 80 in an upstream direction. Hence the apertures 82 are insensitive to the ram effect of the moving fluid and the attendant dynamic pressure head. The disposition of apertures 82 in the manner just described achieves a pressure drop which contributes to the objects of the present invention.

The cooling fluid from plenum 46 is admitted into pocket 80 in a plurality of streams, each stream being associated with an aperture 82. While prior art devices have sought to diffuse these streams by impact with and turning by various wall segments of associated pockets, they have not provided sufficient diffusion to insure that cooling fluid exiting from the cooling ring is of a uniform layer flowing at uniform velocity. Rather in such prior art devices the film of cooling fluid emerging from the cooling ring is comprised of alternating thin and thick sections having a velocity gradient in the circumferential direction. This results in undesirable mixing with the hot gas stream and insufficient heat shielding for portions of the combustor liner.

The preferred embodiment of the present invention overcomes the shortcomings of the aforestated prior art devices by providing a second lip 76 to effect partial diffusion and substantial coalescence of the cooling fluid prior to impact and turning by secondary diffusing means. More specifically, cooling fluid admitted into pocket 80 is directed by apertures 82 to impinge upon and flow along lip 76 generally in the upstream direction. Each cooling fluid stream associated with an aperture 82 has an established velocity profile as it exits apertures 82. Upon striking lip 76, the velocity profile is altered such that the velocity vector associated with each incremental or elemental fluid portion of each stream are changed both in magnitude and direction and vary widely with respect to each other after impingement. As a result, each fluid stream is partially dispersed, or diffused, during impingement upon lip 76 and hence encouraged to mix and coalesce with adjacent streams of cooling fluid. Lip 76 is provided with sufficient length such that substantial coalescence occurs after impingement of the fluid streams on lip 76 and while the streams of cooling fluid flow along its surface in the upstream direction. To provide for complete diffusion of the cooling streams prior to emergence from exit 86, they are directed by lip 76 upon base wall 84 whereupon they are buffeted and redirected in the downstream direction. This secondary diffusion enables the individual fluid streams to be thoroughly broken down and intermixed such that the cooling fluid film will have substantially uniform velocity and thickness around the circumference of the cooling ring as it emerges from exit 86.

The diffusion and coalescence provided by lip 76 in combination with the buffeting and redirection provided by base wall 84 causes cooling fluid to emerge from exit 84 in a homogeneous film of uniform velocity and thickness. Furthermore, the arrangement in the present invention results in the exit velocity of the emerging film being of sufficient magnitude to avoid mixing with the hot gas stream.

It should be understood that in appropriate circumstances it may be desirable to direct fluid along lip 76 but not in impingement thereon. In such an instance the streams of cooling fluid will still coalesce while flowing over lip 76 in a direction opposite to the flow of fluid in plenum 46.

Another aspect of the present invention should be appreciated. In prior art devices, single lips have been used to provide coalescence of the fluid streams and for guiding the cooling fluid in a film on the inner surface of a combustor liner. However, optimal performance requires the lip to be long for the former purpose and short for the latter. A lip of short length is required by the thermal stresses associated with its exposure to the hot gas stream. In the present invention lip 76 is provided only for the purpose of diffusing and substantially coalescing the individual cooling streams. Since lip 76 is not exposed to the hot gas stream but rather is impingement cooled on its radially outer surface and film cooled on its radially inner surface, axial length can be established without consideration of thermal stresses. Similarly, since the present invention, lip 72 is provided only for guiding the cooling fluid onto the combustor liner, lip 72 can be made sufficiently short to eliminate the effects of thermal stresses. Hence, the present invention provides for optimal performance not obtainable by prior art devices.

The present invention was subjected to comparative testing with various prior art cooling rings. FIG. 4 exhibits the geometry of all cooling rings tested and shows the relative comparative results of the tests as a plot of film cooling effectiveness N as a function of distance from the cooling slot exit. Film cooling effectiveness N is mathematically defined by the following relationship $$N = \frac{T_{HG} - T_{AW}}{T_{HG} - T_C}$$

where $T_{HG}$ = Initial Temperature of the Hot Gas
$T_{AW}$ = Temperature of the wall under adiabatic conditions at the distance from the slot exit for which N is being measured
$T_C$ = Initial Temperature of the coolant
$T_{AW}$ is the temperature of the wall when it has reached a constant steady-state temperature.

As is readily observed the present invention exhibited a film cooling effectiveness unexpectedly far superior to the prior art devices. Far superior film cooling effectiveness is particularly apparent at points along the wall remote from the cooling slot exit.

As observed in FIG. 4, Prior Art Device I exhibits a projection extending in the upstream direction. The curve associated with Prior Art Device I indicates substantially inferior performance of the device when compared with the curve associated with the present invention. The inferior performance is attributed to the introduction of fluid into the cooling ring such that it does not impinge upon nor flow along the projection. In the operation of Prior Art Device I, cooling fluid is substantially entrapped between the projection and the radially outward confines of the pocket by cooling fluid subsequently entering the pocket through the aperture. The entrapped cooling fluid prohibits cooling fluid subsequently entering through the aperture from engaging the projection and results in a substantial portion of the cooling fluid immediately exiting from the pocket and into the hot gas chamber without diffusion or coalescence. The present invention provides for the introduction of cooling fluid along the lip 76 in a direction opposite to the flow of fluid in plenum 46 in a manner avoiding entrapment of cooling fluid in any portions of the pocket.

From the foregoing it is now apparent that a cooling ring construction has been provided which is well adapted to fulfill the aforestated objects of the invention and that while one embodiment of the invention has been described for purposes of illustration, it is understood that other equivalent forms of the invention are possible within the scope of the appended claims.

Having thus described the invention, what is claimed as new and useful and desired to be secured by U.S. Letters Patent is:

1. An apparatus for passing a portion of a cooling fluid, flowing in a plenum in a predetermined direction, in a protective film upon a liner partially defining a hot gas passage, comprising:

a first liner segment partially defining the plenum;

a second liner segment partially defining the hot gas passage, the first and second liner segments cooperating to form a pocket;

a first lip at the downstream end of said second liner segment spaced from said first liner segment to form an exit from said pocket for directing cooling air along said first liner segment in said predetermined direction;

a second lip at the upstream end of said first liner segment, said second lip being radially spaced from said first lip and projecting into said pocket;

a plurality of apertures in said first liner adapted to pass cooling fluid in a plurality of streams into said pocket and along said second lip in a direction substantially opposite from said predetermined direction, said second lip having a length sufficient to permit said plurality of streams to at least partially coalesce while passing along said second lip in said opposite direction.

2. The apparatus as set forth in claim 1 wherein said apertures are disposed in said first liner such that said streams of cooling fluid are directed to impinge upon said second lip thereby partially diffusing said fluid streams.

3. The apparatus of claim 2 further comprising secondary diffusion means for additionally diffusing and for turning the flow of said partially coalesced cooling fluid flow to said predetermined direction.

* * * * *